April 24, 1956     S. GILBERT ET AL     2,742,991
FLUID OPERATED ACCESSORY SPLINE DISCONNECT
Filed Oct. 3, 1952
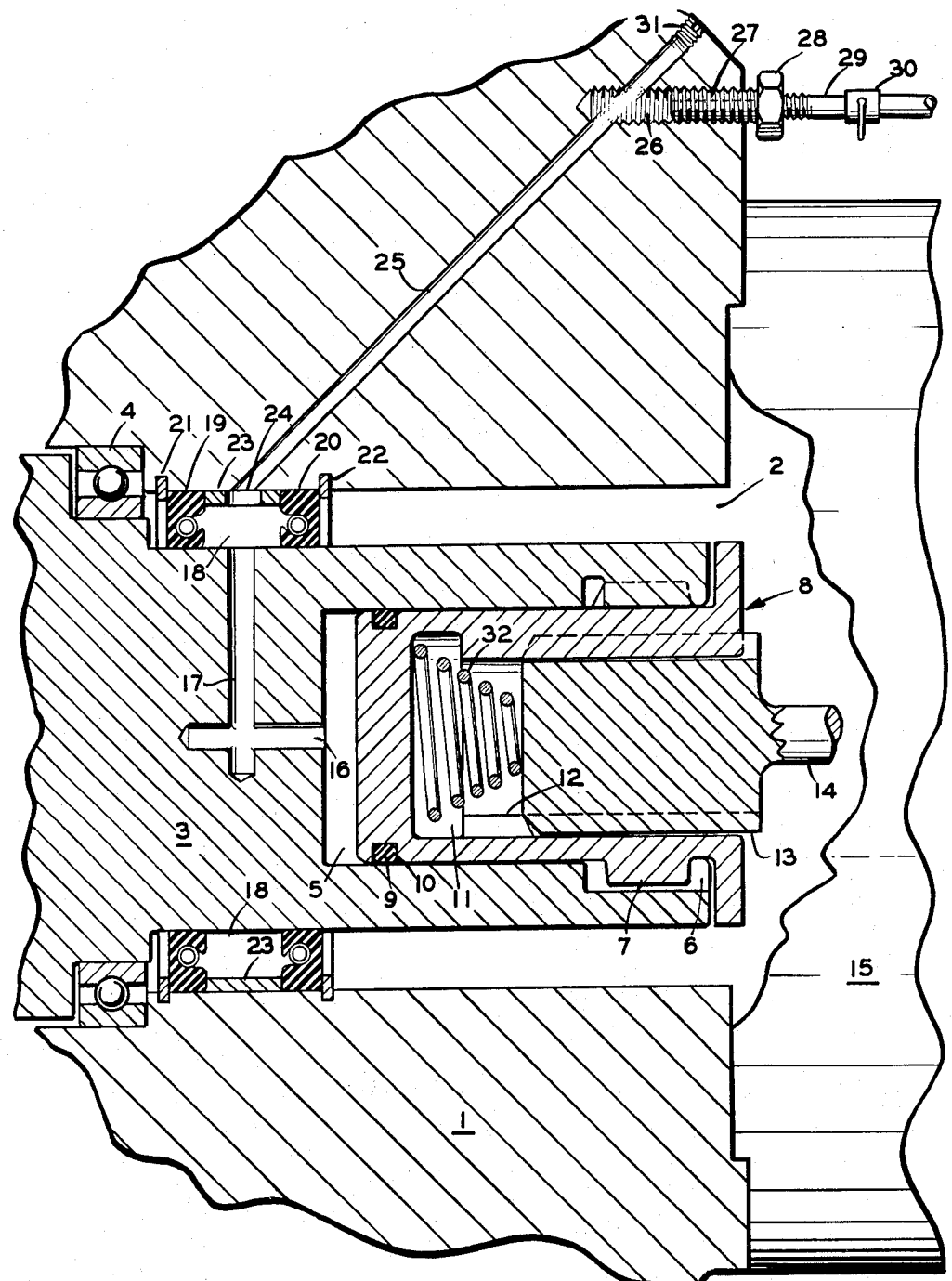
INVENTORS
*SAMUEL GILBERT*
*CHARLES S. METSGER*
BY *James M. Meckels*
ATTORNEY

United States Patent Office 2,742,991
Patented Apr. 24, 1956

2,742,991

FLUID OPERATED ACCESSORY SPLINE DISCONNECT

Samuel Gilbert, Cedar Grove, and Charles S. Metsger, Rochelle Park, N. J., assignors to Bendix Aviation Corporation, Teterboro, N. J., a corporation of Delaware Application October 3, 1952, Serial No. 312,992

3 Claims. (Cl. 192—91)

The present invention relates to engine accessories and more particularly to means for disconnecting accessories from the engine while it is in operation.

In some applications, such as in an aircraft, it is desirable to be able to disconnect the accessory from the engine while the craft is in flight upon failure of the accessory. Usually the accessories are mounted on the engine or engines of the craft and are not accessible during flight. Thus, the faulty accessory is still driven by the engine. In the case where the accessory is a generator, a fire hazard may occur when the faulty generator is driven by the engine.

The present invention provides pressure responsive means, that may be controlled from a remote point, to disconnect a splined engagement thereby to disconnect the accessory drive from the engine.

It is an object of the invention to provide novel means for disconnecting an accessory drive from an engine.

Another object of the invention is to provide novel means for connecting an accessory drive to an engine.

Another object of the invention is to provide novel means for disconnecting an accessory drive from an engine while the engine is running.

The above and other objects and features of the invention will appear more fully hereinafter from a consideration of the following description taken in connection with the accompanying drawing wherein one embodiment of the invention is illustrated by way of example.

In the drawing:

The single figure is a cross sectional view illustrating an embodiment of the invention.

In the drawing, a portion of a mounting pad indicated generally by the numeral 1 has an opening 2 through which extends a shaft 3. The mounting pad 1 is an integral part of the engine (not shown) in the conventional manner. The shaft 3 is rotatably mounted in the pad 1 by bearings 4. The shaft 3 is a portion of the conventional engine gear train.

The shaft 3 has a counterbore 5 which has a splined portion 6 adjacent the mouth thereof and adapted to mate with splines 7 of a piston 8. The piston 8 is adapted for a sliding fit into the counterbore 5. A sealing ring 9 positioned in a channel 10 of the piston 8 forms a seal between the walls of the two members. The piston 8 has a counterbore 11 having internal splines 12 adapted to mesh with splines 13 on shaft 14 of an accessory indicated generally by the numeral 15.

The elements of the accessory 15 have not been shown in the drawing, as they form no part of the invention. The accessory 15 may be secured to the mounting pad 1 in any conventional manner.

The shaft 3 has a passageway 16 extending inward from the counterbore 5 and joining a passageway 17 extending radially in the shaft 3.

A circumferential chamber 18 is formed between the shaft 3 and housing 1 by ring seals 19 and 20. The ring seals 19 and 20 are secured in position by snap rings 21 and 22 and a spacer 23. The spacer 23 has an opening 24 adapted for positioning to register with a passageway 25 in the pad 1. Connecting with the passageway 25 is a passageway 26 having a threaded portion 27 adapted to receive a fitting 28.

A conduit 29 is secured to the fitting 28 and is connected through a valve 30 to a source of fluid pressure (not shown). The pressure source may be the engine oil pressure, compressed air or other conventional fluid pressure sources. In order to facilitate manufacture, the passageway 25 may be drilled from the outside and the outer end closed by a plug 31.

A spring 32 may be inserted in the counterbore 11 between the piston 8 and the end of the accessory shaft 14. The spring 32 is designed so that in the normal operating position no thrust is exerted upon the end of the shaft 14. The spring 32 will prevent creepage of the piston 8 and also serves to return the piston 8 to the operative position upon the pressure being shut off.

In operation upon a fault occurring in the accessory 15, the valve 30 may be actuated to an open position to permit fluid under pressure to enter the counterbore portion 5 through the passageways 26 and 25, chamber 18 and passageways 17 and 16. The fluid pressure exerts a force on the piston 8 to move it axially to disengage the splines 6 and 7 thus permitting the shaft 3 to rotate without rotating the accessory shaft 14. The end of the accessory shaft 14 provides a stop to limit the outward movement of the piston 8. While the valve 30 is shown as being manually operated, it is understood that it may be solenoid operated or any other conventionally operated valve that may be actuated under the control of the operator.

To reset the piston 8, the pressure is turned off and the piston pushed back so that the splines 6 and 7 are again in engagement.

Although only one embodiment of the invention has been illustrated and described, various changes in the form and relative arrangement of the parts, which will now appear to those skilled in the art, may be made without departing from the scope of the invention.

What is claimed is:

1. The combination comprising an engine shaft, an accessory drive shaft, a counterbore portion in said engine shaft, a piston member adapted to fit into said counterbore portion, spline means for selectively connecting said piston member for rotation by said engine shaft, said piston member axially movable relative to said counterbore portion in said engine shaft to cause said spline means to disconnect said piston member from said engine shaft, a splined portion on said accessory drive shaft, internal splines in said piston member adapted to mate with the splined portion on said drive shaft, spring means coacting with said drive shaft for normally biasing said piston member into the counterbore portion of said engine shaft to cause said spline means to connect said engine shaft to said piston member, and a passageway in said engine shaft connected into said counterbore portion of said engine shaft whereby pressure may be applied to said piston member to cause said spline means to disconnect said connection between said piston member and said engine shaft.

2. The combination comprising a driving member, a driven member, a housing adapted to support said driving member for rotation relative thereto, said driving member having a counterbore portion therein concentric therewith, a splined portion in the counterbore portion of said driving member, a piston member adapted for a sliding fit within said counterbore portion, splines on said piston member for selective engagement with the splined portion in the counterbore portion for connecting said piston for rotation by said driving member, said piston member axially movable relative to said counterbore portion in said driving member to disengage said splines from said splined portion, another counterbore in said piston, a splined portion on said driven member, said splined portion of the driven member extending into said piston counterbore, other splines in said piston counterbore mating with the splined portion on said driven member, a passageway in said driving member in communication with the counterbore portion of the driving member, and means including a passageway in said housing cooperating with the passageway in said driving member for supplying fluid under pressure to move said piston axially whereby said splines on the piston member disengage the splined portion in the counterbore portion of the driving member and said piston member is disconnected from said driving member.

3. The combination comprising an engine shaft, an accessory drive shaft, a cylindrical counterbore portion in said engine shaft and having internal splines extending over a limited portion thereof, a cylindrical piston adapted for a sliding fit in said counterbore portion and having external splines adapted to mate with said internal splines, spline means within said piston for connecting said accessory drive shaft to said piston for rotation with said piston, said spline means permitting axial movement of said piston relative to said accessory drive shaft, and means for supplying fluid under pressure to said piston to move said piston axially to disengage said external splines of the piston from the internal splines extending over a limited portion of the counterbore portion in the engine shaft to disconnect the engine shaft from a driving connection with the piston and accessory drive shaft.

References Cited in the file of this patent

UNITED STATES PATENTS

| | | |
|---|---|---|
| 2,379,776 | Young | July 3, 1945 |
| 2,395,459 | Carnagua | Feb. 26, 1946 |
| 2,509,813 | Dineen | May 30, 1950 |
| 2,543,634 | Lee | Feb. 27, 1951 |
| 2,570,641 | Carnagua et al. | Oct. 9, 1951 |
| 2,618,366 | Bryant | Nov. 18, 1952 |
| 2,642,970 | Szekely | June 23, 1953 |